United States Patent
Cape et al.

(10) Patent No.: US 10,899,159 B2
(45) Date of Patent: Jan. 26, 2021

(54) OPTICAL DEVICE THAT PRODUCES FLICKER-LIKE OPTICAL EFFECTS

(71) Applicant: Visual Physics, LLC, Alpharetta, GA (US)

(72) Inventors: Samuel M. Cape, Woodstock, GA (US); Jonathan D. Gosnell, Cumming, GA (US); Gregory R. Jordan, Cumming, GA (US); Scott K. Palm, Reno, NV (US)

(73) Assignee: Visual Physics, LLC, Alpharetta, GA (US)

( * ) Notice: Subject to any disclaimer, the term of this patent is extended or adjusted under 35 U.S.C. 154(b) by 0 days.

(21) Appl. No.: 16/596,642

(22) Filed: Oct. 8, 2019

(65) Prior Publication Data

US 2020/0039277 A1    Feb. 6, 2020

Related U.S. Application Data

(63) Continuation of application No. 15/129,438, filed as application No. PCT/US2015/022907 on Mar. 27, 2015, now Pat. No. 10,434,812.

(Continued)

(51) Int. Cl.
*B42D 25/29* (2014.01)
*G02B 30/27* (2020.01)
(Continued)

(52) U.S. Cl.
CPC ............ *B42D 25/29* (2014.10); *B42D 25/324* (2014.10); *G02B 3/0006* (2013.01);
(Continued)

(58) Field of Classification Search
CPC .... B42D 25/29; B42D 25/324; G02B 3/0031; G02B 3/0006; G02B 27/2214; G09F 19/14
(Continued)

(56) References Cited

U.S. PATENT DOCUMENTS

| | | | |
|---|---|---|---|
| 4,920,039 A * | 4/1990 | Fotland | G09F 19/14 359/619 |
| 5,712,731 A | 1/1998 | Drinkwater et al. | |

(Continued)

FOREIGN PATENT DOCUMENTS

| | | |
|---|---|---|
| CN | 101019155 A | 8/2007 |
| CN | 101443692 A | 5/2009 |

(Continued)

OTHER PUBLICATIONS

Helmut Kipphan (ed.), "Section 2.2 Gravure Printing", Handbook of Print Media: Technologies and Production Methods, 2001, pp. 369-371, Heidelberger Druckmaschinen AG, Germany.

(Continued)

*Primary Examiner* — Justin V Lewis

(57) ABSTRACT

An optical device that produces flicker-like optical effects is provided. The inventive device employs directionally cured image icons. Specifically, the optical device is made up of at least one arrangement of image icons formed from one or more cured pigmented materials, and at least one arrangement of optionally embedded focusing elements positioned to form one or more synthetic images of at least a portion of the arrangement(s) of image icons. Some or all of the pigmented material(s) is cured using collimated light directed through the focusing elements toward the arrangement(s) of image icons at one or more angles relative to a surface of the optical device to form directionally cured image icons. The synthetic image(s) of the directionally cured image icons is viewable at the cure angle(s) and therefore visually appears and disappears, or turns on and off, as the viewing angle of the device moves through the cure angle(s).

13 Claims, 3 Drawing Sheets

Related U.S. Application Data

(60) Provisional application No. 61/971,240, filed on Mar. 27, 2014.

(51) Int. Cl.
  *G02B 3/00* (2006.01)
  *G09F 19/14* (2006.01)
  *B42D 25/324* (2014.01)
  *B44F 1/00* (2006.01)

(52) U.S. Cl.
  CPC ........... *G02B 3/0031* (2013.01); *G02B 30/27* (2020.01); *G09F 19/14* (2013.01)

(58) Field of Classification Search
  USPC ........ 283/67, 70, 72, 74, 75, 77, 91, 94, 98, 283/901
  See application file for complete search history.

(56) References Cited

U.S. PATENT DOCUMENTS

| | | |
|---|---|---|
| 6,144,795 A | 11/2000 | Dawes et al. |
| 6,396,636 B2 | 5/2002 | Sawaki et al. |
| 8,739,711 B2 | 6/2014 | Cote |
| 8,906,184 B2 | 12/2014 | Hoffmann et al. |
| 9,132,690 B2 | 9/2015 | Raymond et al. |
| 9,399,366 B2 | 7/2016 | Hoffmuller et al. |
| 9,592,700 B2 | 3/2017 | Raymond et al. |
| 9,701,150 B2 | 7/2017 | Raymond et al. |
| 2005/0180020 A1 | 8/2005 | Steenblik et al. |
| 2008/0037131 A1 | 2/2008 | Steenblik et al. |
| 2008/0067801 A1 | 3/2008 | Schilling et al. |
| 2008/0116272 A1 | 5/2008 | Giering et al. |
| 2011/0019128 A1 | 1/2011 | Takata |
| 2011/0109078 A1 | 5/2011 | Hoffmuller et al. |
| 2012/0105928 A1 | 5/2012 | Camus et al. |
| 2012/0153607 A1 | 6/2012 | Rahm et al. |
| 2013/0056971 A1 | 3/2013 | Holmes |
| 2013/0069360 A1 | 3/2013 | Power et al. |
| 2014/0376091 A1 | 12/2014 | Jordan et al. |
| 2017/0173990 A1 | 6/2017 | Cape et al. |
| 2018/0178577 A1 | 6/2018 | Lister |

FOREIGN PATENT DOCUMENTS

| | | |
|---|---|---|
| CN | 101563640 A | 10/2009 |
| CN | 101978292 A | 2/2011 |
| CN | 102438838 A | 5/2012 |
| CN | 103097919 A | 5/2013 |
| CN | 103477250 A | 12/2013 |
| DE | 102011114750 A1 | 4/2013 |
| DE | 102011115125 A1 | 4/2013 |
| EP | 0439092 A2 | 7/1991 |
| FR | 3018474 A1 | 9/2015 |
| JP | S63-500127 A | 1/1988 |
| JP | 2002-169223 A | 6/2002 |
| JP | 2004-163530 A | 6/2004 |
| JP | 2007-514188 A | 5/2007 |
| JP | 2009-536885 A | 10/2009 |
| JP | 2009-262375 A | 11/2009 |
| JP | 2010-14780 | 1/2010 |
| JP | 2013-537640 A | 10/2013 |
| JP | 2014-514177 A | 6/2014 |
| WO | 2005052650 A2 | 6/2005 |
| WO | 2010113114 A2 | 10/2010 |
| WO | 2011012460 A2 | 2/2011 |
| WO | 2011107791 A1 | 9/2011 |
| WO | 2012121622 A1 | 9/2012 |
| WO | 2015148878 A2 | 10/2015 |
| WO | 2016149760 A1 | 9/2016 |

OTHER PUBLICATIONS

IP Australia, "Examination report No. 1 for standard patent application," Application No. AU 2015289606, Jan. 14, 2020, 2 pages.
Brazil National Institute of Industrial Property, "Search Report," Application No. 112017000914-5, dated Mar. 24, 2020, 8 pages.
China National Intellectual Property Administration, "Third Office Action," Application No. 201580049896.5, dated Jan. 4, 2019, 12 pages.
China National Intellectual Property Administration, "Fourth Office Action," Application No. CN201580049896.5, dated Sep. 3, 2019, 8 pages.
China National Intellectual Property Administration, First Office Action and Search Report, Application No. CN201810391917.7, dated Apr. 25, 2019, 18 pages.
China National Intellectual Property Administration, "Second Office Action," Application No. 201810391917.7, dated Dec. 6, 2019, 8 pages.
China National Intellectual Property Administration, "First Office Action," Application No. CN201810391431.3, dated Jul. 29, 2019, 54 pages.
Egyptian Patent Office, "Technical Report," Application No. EG 2017010085, dated Dec. 31, 2019, 11 pages.
Indonesia Directorate General of Intellectual Property, "Office Action," Application No. IDP00201700996, dated May 27, 2019, 5 pages.
Japan Patent Office, Notice of Reasons for Rejection, Application No. JP 2017-502818, dated Jun. 25, 2019, 11 pages.
Japan Patent Office, "Decision of Refusal," Application No. JP 2017-502818, dated Mar. 3, 2020, 5 pages.
IMP—Mexican Institute of Industrial Property, Office Action in connection with Mexican Application No. MX/a/2017/000681, dated Dec. 16, 2019, 5 pages.
IMPI—Mexican Institute of Industrial Property, Office Action in connection with Mexican Application No. MX/a/2016/012305, dated Jan. 17, 2020, 6 pages.
Russian Federation Federal Service for Intellectual Property (ROSPATENT), "Office Action," Application No. 2017104544/12(008106), dated Oct. 31, 2018, 6 pages.
ISA/EP, International Search Report and Written Opinion of the International Searching Authority, International Application No. PCT/US2015/040745, dated Jan. 27, 2016, 32 pages.
International Preliminary Report on Patentability for International Application No. PCT/US2018/035183, dated Dec. 19, 2019, 9 pages.
Egyptian Patent Office, "Technical Report," Application No. EG2016091551, dated Oct. 23, 2019, 10 pages.
Intellectual Property India, "Examination report under sections 12 & 13 of the Patents Act, 1970 and the Patents Rules, 2003," Application No. IN201617035309, dated Nov. 28, 2019, 10 pages.
China National Intellectual Property Administration, "Third Office Action," Application No. 201810391917.7, dated May 15, 2020, 7 pages.
China National Intellectual Property Administration, "Second Office Action," Application No. CN201810391431.3, dated May 7, 2020, 20 pages.
Intellectual Property India, "Examination report under sections 12 & 13 of the Patents Act, 1970 and the Patents Rules, 2003," Application No. IN201717004418, dated Jun. 3, 2020, 6 pages.
European Patent Office, "Communication pursuant to Rule 94(3) EPC," Application No. EP15718022.5, dated Aug. 24, 2020, 5 pages.
Egyptian Patent Office, "Technical Report," Application No. EG 2017010085, dated Jun. 20, 2020, 3 pages.
Japan Patent Office, "Notice of Reasons for Refusal," Application No. JP 2019-203756, dated Oct. 20, 2020, 8 pages.
China National Intellectual Property Administration, "Third Office Action," Application No. CN201810391431.3, dated Nov. 3, 2020, 14 pages.
Egyptian Patent Office, "Notice of Acceptance," Application No. EG 2017010085, dated Nov. 11, 2020, 1 page.

* cited by examiner

OPTICAL DEVICE THAT PRODUCES FLICKER-LIKE OPTICAL EFFECTS

CROSS-REFERENCE TO RELATED APPLICATION(S)

This application is a continuation of application Ser. No. 15/129,438, which is the National Stage of International Application No. PCT/US2015/022907, filed Mar. 27, 2015, which claims priority to U.S. Provisional Patent Application No. 61/971,240, filed Mar. 27, 2014, the disclosures of which are incorporated herein by reference.

TECHNICAL FIELD

The present invention generally relates to an optical device that produces flicker-like optical effects, and more particularly relates to an optical device that employs directionally cured image icons.

BACKGROUND

Micro-optic film materials projecting synthetic images generally comprise: an arrangement of micro-sized image icons; an arrangement of focusing elements (e.g., microlenses, microreflectors); and optionally, a light-transmitting polymeric substrate. The image icon and focusing element arrangements are configured such that when the arrangement of image icons is viewed using the arrangement of focusing elements, one or more synthetic images are projected. The projected images may show a number of different optical effects.

These micro-optic film materials may be used as security devices for authentication of banknotes, secure documents and products. For banknotes and secure documents, these materials are typically used in the form of a strip, patch, or thread and can be partially embedded within the banknote or document, or applied to a surface thereof. For passports or other identification (ID) documents, these materials could be used as a full laminate or inlayed in a surface thereof. For product packaging, these materials are typically used in the form of a label, seal, or tape and are applied to a surface thereof.

Examples of micro-optic film materials are described and shown in U.S. Pat. Nos. 7,333,268 and 7,468,842. These references both describe a microstructure approach to forming image icons, in which the image icons are formed from voids in a microstructure or from solid regions, singly or in combination. The voids are optionally filled or coated with a material having a different index of refraction than the surrounding or underlying material, a dyed material, a metal, or a pigmented material. Such an approach has the benefit of almost unlimited spatial resolution.

SUMMARY

An exemplary method of manufacturing these micro-optic film materials is to form the icons as voids in a radiation cured liquid polymer that is cast against a base film, such as 75 gage adhesion-promoted polyethylene terephthalate (PET) film, then to form the lenses from radiation cured polymer on the opposite face of the base film in correct alignment or skew with respect to the icons, then to fill the icon voids with a submicron particle pigmented coloring material by gravure-like doctor blading against the film surface, solidify the fill by suitable means (e.g., solvent removal, radiation curing, or chemical reaction), and finally apply an optional sealing layer that may be either clear, dyed, pigmented, or incorporate covert security materials. Here, the means for solidifying the fill is non-directional and applied directly to the image icon layer and not through the lenses. Synthetic images of such non-directionally cured icons are viewable over a wide range of angles.

The icon voids may include multiple icon fill materials. For example, in col. 49, lines 36-63, of U.S. Pat. No. 7,468,842, icon voids are underfilled with a first icon fill material, and optionally stabilized (e.g., by radiation curing). The icon voids are then optionally filled with a second icon fill material. In this example, the icon fill material is stabilized by non-directional techniques such as non-directional curing that is applied directly to the icon fill material and not through the lenses.

Another example of a micro-optic film material is known from U.S. Pat. No. 7,738,175. This reference discloses a synthetic micro-optic system that produces a flicker-like optical effect. The system produces an in-plane image formed from an array or pattern of image icons and an array of focusing elements. Here, the in-plane image is defined as an image that has some visual boundary, pattern, or structure that visually lies substantially in the plane of the substrate on which or in which the in-plane image is carried. The system also produces at least one out-of-plane synthetic image, the out-of-plane synthetic image(s) operating to modulate or control the extent of the appearance of the in-plane synthetic image. In one embodiment, the out-of-plane synthetic image serves to control the field of view of the in-plane image and, thus, serves to modulate or control the extent of appearance of the in-plane image. Here, the appearance of the in-plane image visually appears and disappears, or turns on and off, depending upon the viewing angle of the system.

By way of the present invention, it has been discovered that directionally curing the image icon layer of these film materials through the lens layer using collimated light greatly increases the range of optical effects demonstrated by these materials.

The present invention therefore provides an optical device that produces flicker-like optical effects, wherein the optical device comprises at least one arrangement of image icons formed from one or more cured pigmented materials, and at least one arrangement of optionally embedded focusing elements positioned to form one or more synthetic images of at least a portion of the arrangement(s) of image icons, wherein some or all of the pigmented material(s) is cured using collimated light directed through the focusing elements at one or more angles relative to a surface of the optical device (hereinafter "the cure angle(s)") to form directionally cured image icons, wherein the synthetic image(s) of the directionally cured image icons is viewable at the cure angle(s) and therefore visually appears and disappears, or turns on and off, as the viewing angle of the device moves through the cure angle(s).

The term "pigmented material", as used herein, is intended to mean any material capable of imparting a color to the image icons and to the synthetic image(s) of the inventive device, which is curable by collimated light. In one contemplated embodiment, the pigmented material is a curable pigment dispersion (i.e., pigment particles in a curable medium or carrier).

As will be explained in more detail below, the synthetic image(s) projected by the inventive optical device may demonstrate a number of distinct visual effects when the device is tilted about an axis substantially parallel to the plane of the device. For example, the synthetic image(s) may show orthoparallactic movement (OPM) (i.e., when the device is tilted the images move in a direction of tilt that appears to be perpendicular to the direction anticipated by normal parallax). Unlike the prior art micro-optic system described above that produces a flicker-like optical effect, the image(s) projected by the present invention is not necessarily an image that visually lies substantially in the plane of the device but may also appear to rest on a spatial plane that is visually deeper than the thickness of the device, or may appear to rest on a spatial plane that is a distance above the surface of the device. The image(s) may also appear to oscillate from a position above the device to a position below the device, or the reverse, as the device is rotated through a given angle (e.g., 90 degrees), then returning to its original position as the device is further rotated by the same amount.

The image icons of the inventive device, which are prepared using one or more cured pigmented materials, may be made in the form of posts, or in the form of voids or recesses on or within a surface of the inventive optical device. The posts may be formed from the pigmented material(s), or the areas surrounding the posts or the voids or recesses may be either coated or partially or completely filled with the pigmented material(s). The size, form and shape of the icons are not limited. In fact, embodiments are contemplated in which two or more types of image icons (e.g., micro- and nano-sized image icons) are in register with one another within one arrangement or layer of image icons within the inventive device.

In one exemplary embodiment, each image icon in the arrangement(s) of image icons is formed from one cured pigmented material, the pigmented material being cured using collimated light at a given angle. In this embodiment, the synthetic image(s) is viewable at the cure angle. In other words, the projected synthetic image(s) flickers or turns on and off, as the viewing angle of the device moves through the cure angle.

Image icons formed from two or more pigmented materials may be prepared by curing each material with collimated light, or by curing one material with collimated light and another material with another means for curing (e.g., non-directional radiation curing, chemical reaction). Synthetic images formed from the directionally cured pigmented materials would be viewable at the cure angle(s), while synthetic images formed from the non-directionally cured pigmented materials would be viewable over a wide range of angles. It is noted that the arrangement(s) of image icons used in the practice of the present invention may also include prior art image icons formed in their entirety from non-directionally cured pigmented materials.

In one such exemplary embodiment, each image icon in the arrangement(s) of image icons is formed from two cured pigmented materials, each having a different color. Each pigmented material is cured using collimated light at an angle through the focusing elements that is different from the angle used to cure the other pigmented material. The optical device, in this exemplary embodiment, will project a synthetic image(s) of a first color that is viewable at the first cure angle, and a synthetic image(s) of a second color that is viewable at the second cure angle.

This exemplary embodiment can be produced by curing a colored pigmented material using collimated light from one angle, washing the uncured pigmented material from the device, and then adding a second colored pigmented material and curing it. As will be readily appreciated, a large number of colored pigmented materials could be added this way.

In another such exemplary embodiment, each image icon in the arrangement(s) of image icons is formed from one cured fluorescent pigmented material and from one cured non-fluorescent pigmented material. As will be readily appreciated, a fluorescent feature that is detectable only at a given angle but not at another given angle may serve as an effective machine readable authenticating feature.

In a preferred embodiment, the inventive optical device is used with an ID card having one or more security print features (e.g., text, photo). The security print feature(s) would be visible at select viewing angles while the synthetic image(s) projected by the inventive device would be visible at other select viewing angles. In this way, the synthetic image(s) would not obscure or impair the security print feature(s).

In a further exemplary embodiment, the inventive optical device is a laser marked optical device that basically comprises an optical device as described above (e.g., an optical film material), and optionally one or more layers located above and/or below the optical device, wherein at least one arrangement or layer of the optical device or at least one layer above or below the optical device is a laser markable arrangement or layer, and wherein the laser markable arrangement(s) or layer(s) has one or more laser marked static two dimensional (2D) images thereon.

The present invention further provides sheet materials and base platforms that are made from or employ the inventive optical device, as well as documents made from these materials. The term "documents", as used herein designates documents of any kind having financial value, such as banknotes or currency, bonds, checks, traveler's checks, lottery tickets, postage stamps, stock certificates, title deeds and the like, or identity documents, such as passports, ID cards, driving licenses and the like, or non-secure documents, such as labels. The inventive optical device is also contemplated for use with consumer goods as well as bags or packaging used with consumer goods.

In one such embodiment, the optical device is in the form of a patch embedded in a polymer ID card.

Other features and advantages of the invention will be apparent to one of ordinary skill from the following detailed description and drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

FIG. 1 is a cross-sectional side view of the optical device before any pigmented material has been incorporated therein;

FIG. 2 is the optical device shown in FIG. 1, where voids in the image icon layer are shown filled with a first pigmented material and incident light in the form of parallel rays is shown impinging on the focusing element arrangement normal to its surface;

FIG. 3 is the optical device shown in FIG. 2, where uncured first pigmented material has been removed from the image icon layer leaving only the cured first pigmented material and the original icon structure behind;

FIG. 4 is the optical device shown in FIG. 3, where recreated voids are shown filled with a second pigmented material, and collimated light is shown impinging on the focusing element arrangement at a different cure angle;

FIG. 5 is the optical device shown in FIG. 4, where the uncured second pigmented material has been removed from the image icon layer leaving the cured first and second pigmented materials and original icon structure behind; and FIG. 6 is the optical device shown in FIG. 5, where recreated voids are shown filled with a third pigmented material, and non-collimated (scattered) light is shown impinging on the focusing element arrangement.

DETAILED DESCRIPTION

Figure 1:
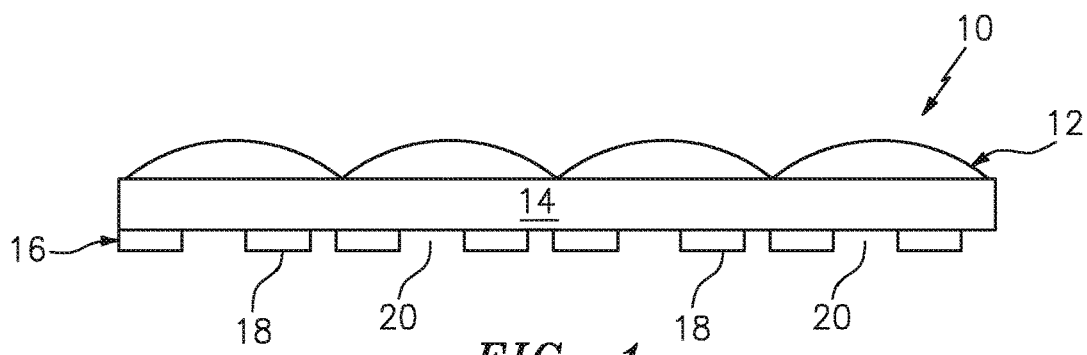
FIGS. 1-6 depict a method for forming the image icon arrangement or layer of one exemplary embodiment of the optical device of the present invention.

By way of the present invention, a flicker-like optical effect that optionally changes color when viewed from different viewing angles is produced which does not necessarily lie in the plane of the optical device. The inventive optical device may be used in conjunction with laser engraving allowing for, in at least one embodiment, superior laser engraving through the optical device.

As noted above, the optical device of the present invention comprises at least one arrangement of image icons formed from one or more cured pigmented materials, and at least one arrangement of optionally embedded focusing elements positioned to form one or more synthetic images of at least a portion of the arrangement(s) of image icons, wherein some or all of the pigmented material(s) is cured using collimated light directed through the focusing elements at one or more angles relative to a surface of the optical device (the cure angle(s)) to form directionally cured image icons, wherein the synthetic image(s) of the directionally cured image icons is viewable at the cure angle(s) and therefore visually appears and disappears, or turns on and off, as the viewing angle of the device moves through the cure angle(s).

The synthetic image(s), when viewed at the cure angle(s), whether in reflective or transmitted light, may demonstrate one or more of the following optical effects: i. show orthoparallactic movement; ii. appear to rest on a spatial plane deeper than the thickness of the optical device; iii. appear to rest on a spatial plane above a surface of the optical device; iv. oscillate between a spatial plane deeper than the thickness of the optical device and a spatial plane above a surface of the optical device as the device is azimuthally rotated; v. exhibit complex three dimensional structures, patterns, movements, or animations; and/or vi. have in-plane images that appear and disappear, stay static but have dynamic bands of color moving throughout, or are animated with dynamic bands of color moving throughout.

As described in PCT/US2004/039315 to Steenblik et al., the magnitude of the magnification or synthetic magnification of the images as well as the above-noted visual effects are dependent upon the degree of "skew" between the arrangements (e.g., arrays) of focusing elements (e.g., lenses) and image icons, the relative scales of the two arrays, and the f-number of the focusing elements or lenses, with the f-number being defined as the quotient obtained by dividing the focal length of the lens (f) by the effective maximum diameter of the lens (D).

As also described in PCT/US2004/039315 to Steenblik et al., orthoparallactic effects result from a "scale ratio" (i.e., the ratio of the repeat period of the image icons to the repeat period of the focusing elements or lenses) substantially equal to 1.0000, when the symmetry axes of the focusing elements and image icons are misaligned. The appearance of resting on a spatial plane deeper than the thickness of the inventive optical device results from a "scale ratio" of less than 1.0000, when the symmetry axes of the focusing elements and image icons are substantially aligned, while the appearance of resting on a spatial plane above a surface of the inventive device results from a "scale ratio" of greater than 1.0000, when the symmetry axes of the focusing elements and image icons are substantially aligned. The appearance of oscillating between a spatial plane deeper than the thickness of the optical device and a spatial plane above a surface of the optical device as the device is azimuthally rotated results from axially asymmetric values of the scale ratio (e.g., 0.995 in the X direction, and 1.005 in the Y direction).

The image icons used in the practice of the present invention, which are prepared using one or more cured pigmented materials, may be made in the form of posts, or in the form of voids or recesses on or within a surface of the inventive optical device. The posts may be prepared from the cured pigmented material(s), or the areas surrounding the posts or the voids or recesses may be either coated or partially or completely filled with the pigmented material(s). While the size, form and shape of the icons are not limited, these raised or recessed icons may assume the form or shape of, for example, positive or negative symbols, letters and/or numerals that may be visually detected and possibly machine detected or machine read. They may also constitute bas-relief structures that give a three-dimensional effect, or composite or mosaic-like images formed by a plurality of spaced apart, raised or recessed icons that may take the form of lines, dots, swirls, or combinations thereof. In one contemplated embodiment, the image icons used in the practice of the present invention are raised or recessed icons having a height or recess depth ranging from about 0.5 to about 8 microns.

As noted above, embodiments are contemplated in which two or more types of image icons (e.g., micro- and nano-sized image icons) are in register with one another within one arrangement or layer of image icons within the inventive device. For those embodiments, a form of preferred curing is required. One form of preferred curing, contemplated by way of the present invention, is differential dissolution of the fill, which may be accomplished using structures of different size and fills of differing solubility. This may be combined with collimated curing to produce different structures with different compositions on a single layer. Collimated curing may also be used alone as a means for producing such single layers of multifunctional micro- and/or nano-sized image icons.

Pigmented materials contemplated for use in the present invention include, but are not limited to, pigmented resins and inks. In an exemplary embodiment, a sub-micron pigment in the form of a pigment dispersion, which is available from Sun Chemical Corporation under the product designation 'Spectra Pac', is used. To this pigment dispersion is added other curable (e.g., ultraviolet (UV) curable) materials and photoinitiators so as to achieve a curable pigmented material suitable for use in the present invention. The resulting curable pigmented material is then used to prepare the posts, or to fill the voids (or recesses) and/or the regions surrounding the posts.

The optionally embedded focusing elements used in the practice of the present invention include, but are not limited to, refractive focusing elements, reflective focusing elements, hybrid refractive/reflective focusing elements, and combinations thereof. In one contemplated embodiment, the focusing elements are refractive microlenses. Examples of suitable focusing elements are disclosed in U.S. Pat. No. 7,333,268 to Steenblik et al., U.S. Pat. No. 7,468,842 to Steenblik et al., and U.S. Pat. No. 7,738,175 to Steenblik et al., all of which are fully incorporated by reference as if fully set forth herein.

Embedment of the focusing elements serves to improve the inventive optical device's resistance to optically degrading external effects. In one such embodiment, the refractive index from an outer surface of the inventive device to refracting interfaces is varied between a first and a second refractive index, the first refractive index being substantially or measurably different than the second refractive index. The phrase "substantially or measurably different", as used herein, means a difference in refractive index that causes the focal length(s) of the focusing elements to change at least about 0.1 micron.

The embedding material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions.

The optical device of the present invention, in an exemplary embodiment in which the focusing elements are microlenses and each image icon in the arrangement(s) of image icons is formed from one cured pigmented material, may be prepared by: (a) applying a substantially transparent or clear radiation curable resin to upper and lower surfaces of an optical spacer or spacer layer; (b) forming a microlens array on the upper surface and an icon array in the form of voids (or recesses) and/or posts on the lower surface of the optical spacer; (c) curing the substantially transparent or clear resin using a source of radiation; (d) filling the icon array recesses and/or areas surrounding the posts with one or more pigmented materials; (e) removing excess pigmented material(s) from the lower surface of the optical spacer; and (f) curing some or all of the pigmented material(s) using collimated (made parallel) light directed through the focusing elements toward the icon layer at one or more angles relative to a surface of the optical device.

The curing of the pigmented material(s) involves directing collimated light from a collimated light source through the microlens array toward the icon array such that the resulting light impinging on the array causes curing of the pigmented material(s). Suitable collimated light sources include laser light, light (e.g., sunlight, UV light, infrared (IR) light) directed through one or more collimating lenses, through a narrow slit, toward a parabolic reflector, from a more directional source such as an array of LEDs, or combinations thereof. In one contemplated embodiment, the collimated light source is a UV lithography exposure unit.

Referring now to the drawings in detail, FIGS. 1-6 depict a method for forming the image icon arrangement or layer of one exemplary embodiment of the optical device of the present invention. In FIG. 1, a cross-sectional side view of the optical device before any pigmented material has been incorporated therein is shown generally at 10. Device 10 basically comprises: (a) an arrangement of focusing elements 12; (b) a base film or optical spacer 14; and (c) a partially formed image icon layer (i.e., original icon structure) 16 prepared from a substantially transparent or clear radiation curable resin 18 with icon recesses or voids 20 therein.

Figure 2:
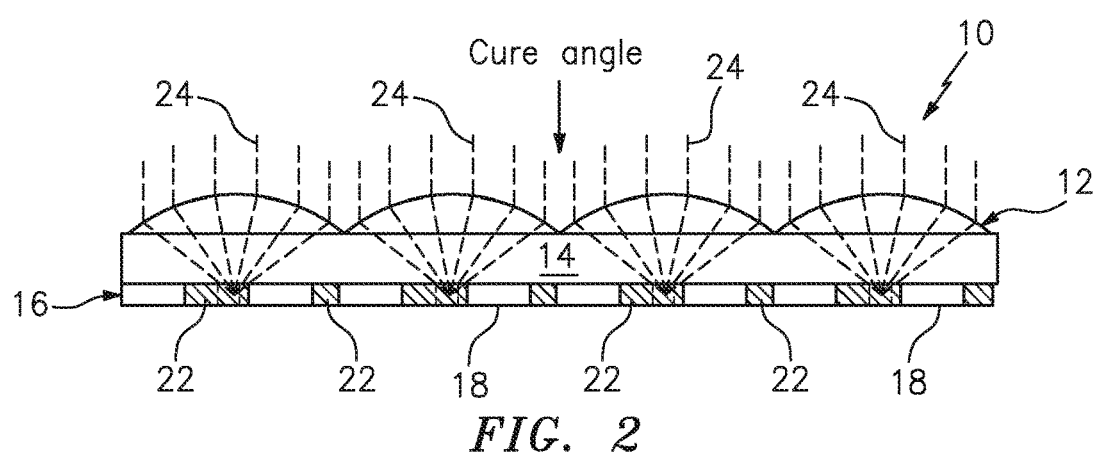

In a first step of the method for forming the image icon arrangement or layer, which is shown in FIG. 2, the voids 20 are filled with a first pigmented material 22. Incident light 24 in the form of parallel rays impinges normal to the surface of the focusing element arrangement 12. In other words, the parallel rays come in at an angle equal to zero. Each focusing element focuses its respective incident light onto the image icon arrangement or layer, with the focusing occurring at the approximate focal distance of the focusing element. The areas of the filled voids that are very close to the focal points are cured. The areas of the filled voids that are not near a focal point will not be cured.

Figure 3:
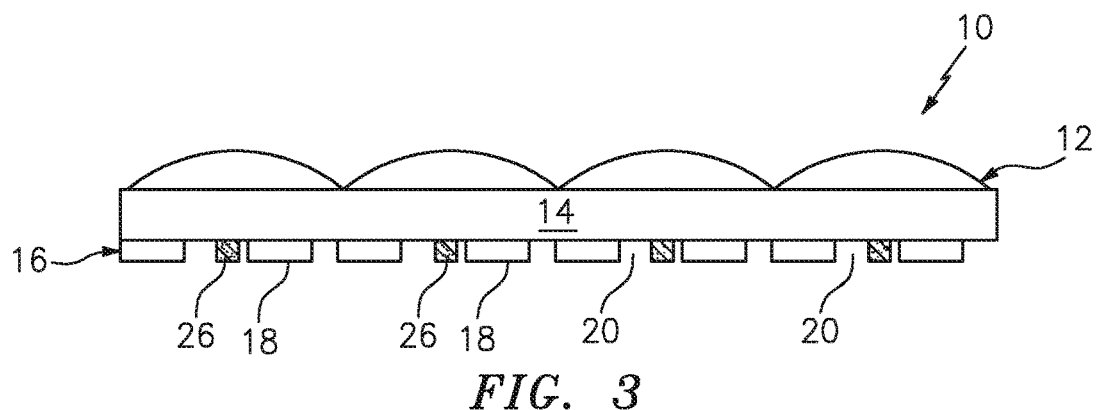

The uncured first pigmented material 22 is then removed (e.g., washed away) leaving, as best shown in FIG. 3, only the cured first pigmented material 26 and the original icon structure 16 behind. This step recreates voids 20 in the image icon arrangement or layer.

Figure 4:
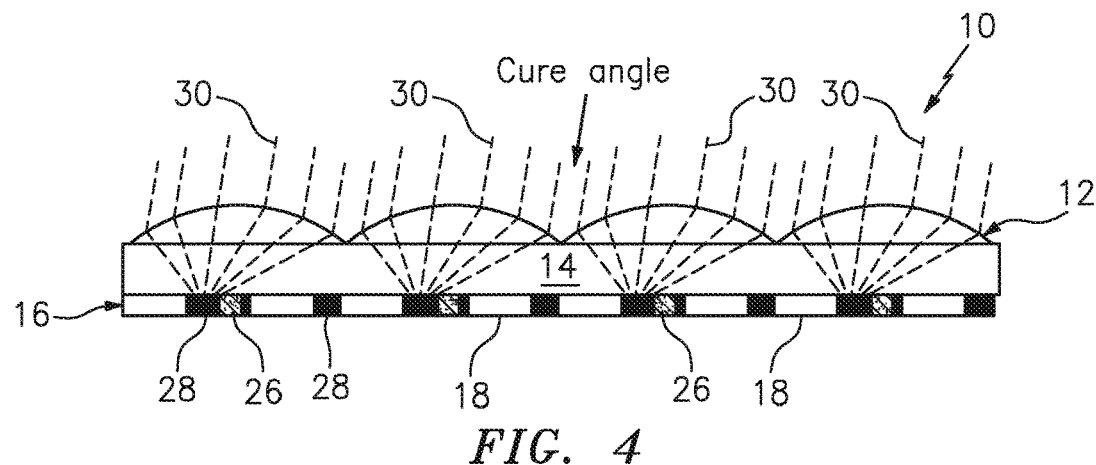

In the next step, the recreated voids 20 are filled with a second pigmented material 28. A different cure angle is chosen, and collimated light 30 is produced that comes from that angle. As shown in FIG. 4, the cure angle is coming from the upper-right of the surface of the device 10. The collimated light 30 consists of all parallel rays. As before, some of the voids 20 are very close to the focal points of the focusing elements, and the second pigmented material 28 in those zones is cured. Some of the pigmented material 28 is not exposed because it is not close to a focal point and so it remains uncured.

Figure 5:
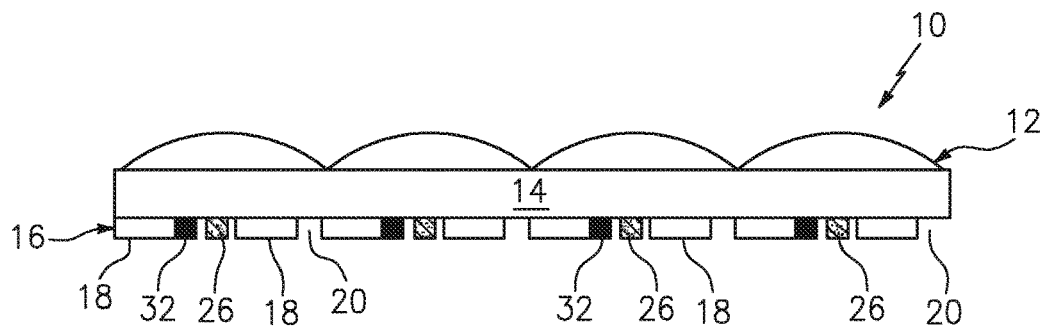

The uncured second pigmented material 28 is then removed leaving, as best shown in FIG. 5, the cured first pigmented material 26 and cured second pigmented material 32 and the original icon structure 16 behind. Again, this step recreates voids 20 in the image icon arrangement or layer.

Figure 6:
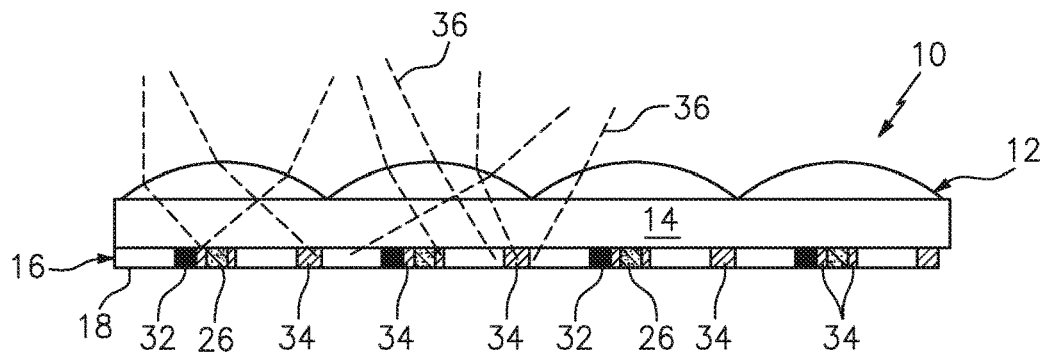

In the next step, the recreated voids 20 are filled with a third pigmented material 34. As shown in FIG. 6, the material is cured using non-collimated (scattered) light 36. As a result, there is no effective focusing by the focusing elements, and the entire icon layer is exposed. Effectively this ensures that all of the third pigmented material 34 is cured.

One or more of the method steps involving the filling of the voids with a pigmented fill material may be performed using an unpigmented material that is designed to not absorb laser light. This provides "vacant" icon spaces, the benefits of which will be discussed further below.

Figure 7:
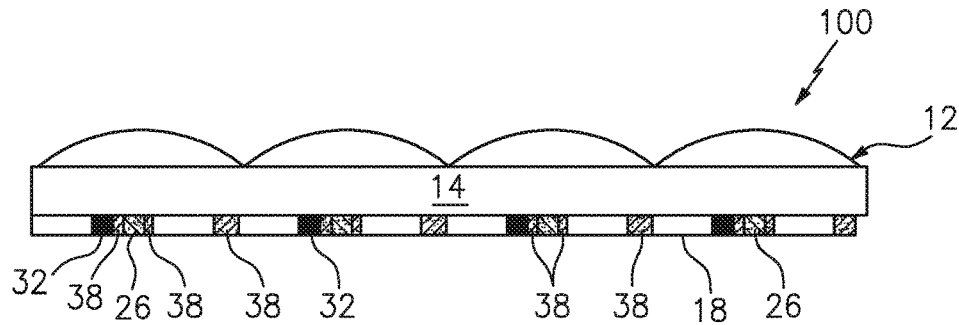
FIG. 7 is a cross-sectional side-view of the exemplary embodiment of the optical device of the present invention prepared in accordance with the method depicted in FIGS. 1-6. The device has three different fill materials, two of which were directionally cured.

The optical device prepared in accordance with this method is shown in FIG. 7 and marked with reference number 100. There are three different cured pigment materials 26, 32, 38 (cured third pigmented material) in this case, two of which (26, 32) were directionally cured.

Figure 8:
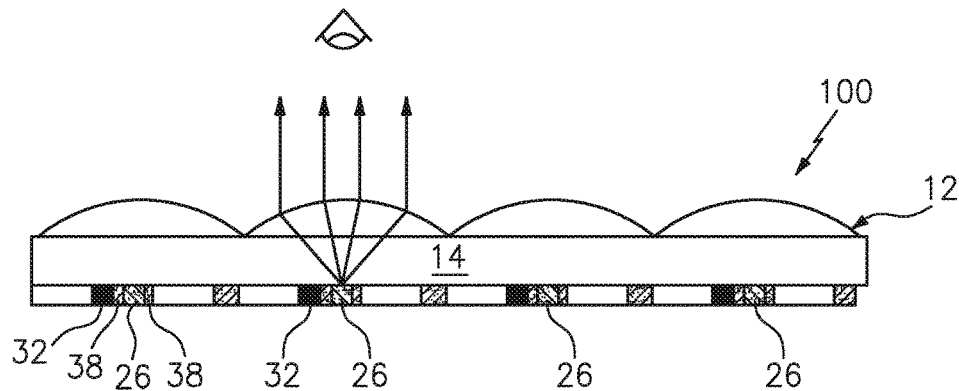
FIG. 8 is the optical device shown in FIG. 7, showing an observer viewing the device from the first cure angle.
Figure 9:
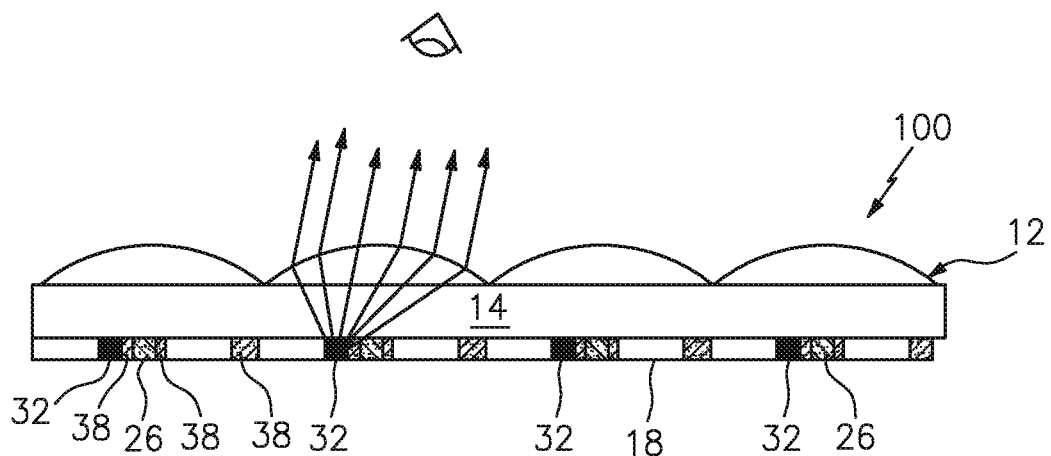
FIG. 9 is the optical device shown in FIG. 7, showing an observer viewing the device from the second cure angle.
Figure 10:
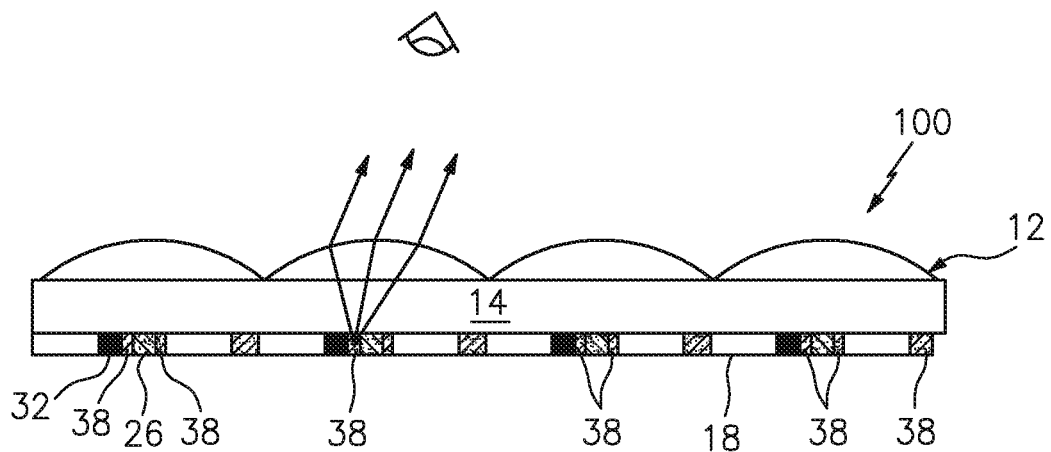
FIG. 10 is the optical device shown in FIG. 7, showing an observer viewing the device from a third cure angle.

Referring now to FIG. 8, an observer, who is viewing the device 100 from the first cure angle, sees the synthetic image(s) associated with the cured first pigmented material 26. In FIGS. 8-10, the observer is "very far away" from the device such that the observer's effective angle to each of the focusing elements in FIG. 8, for example, is equivalent to the first cure angle. The synthetic image(s) associated with the cured first pigmented material 26 is only visible from the first cure angle.

An observer, who is viewing the device from the second cure angle (see FIG. 9), sees the synthetic image(s) associated with the cured second pigmented material 32. This synthetic image(s) is only visible from the second cure angle.

An observer, who views the device from an angle which is not one of the cure angles (see FIG. 10), sees the synthetic image(s) associated with the cured third pigmented material 38. This synthetic image(s) is visible from any angle that is not equivalent to the first cure angle or the second cure angle. In some cases, especially those in which the optical device or system has a large f-number, an observer may view the device from a high angle (i.e., an angle far from the "normal" angle). As the viewing angle becomes high enough, the line of sight through a focusing element will begin to see the image icons that are underneath an adjacent focusing element. In this type of situation, an observer may see one or more synthetic images associated with a specific cure angle at an angle other than the specific cure angle.

The optical spacer or spacer layer may be formed using one or more essentially transparent or translucent polymers including, but not limited to, polycarbonate, polyester, polyethylene, polyethylene napthalate, polyethylene terephthalate, polypropylene, polyvinylidene chloride, and the like. In an exemplary embodiment, the optical spacer or spacer layer is formed using polyester or polyethylene terephthalate.

It is noted that while the use of an optical spacer or spacer layer is mentioned in the above exemplary embodiment, the optical device of the present invention may also be prepared without an optical spacer or spacer layer.

Suitable radiation curable resins include, but are not limited to, acrylics, epoxies, polyesters, acrylated polyesters, polypropylenes, urethanes, acrylated urethanes, and the like. Preferably, the arrays are formed using an acrylated urethane, which is available from Lord Chemicals.

As previously mentioned, image icons formed from two or more pigmented materials may be prepared by curing each material with collimated light, or by curing one material with collimated light and another material with another means for curing (e.g., radiation curing, chemical reaction). Synthetic images of the image icons formed from such directionally cured pigmented material(s) would be viewable at the cure angle(s), while synthetic images of the image icons formed from the non-directionally cured pigmented materials would be viewable over a wide range of angles. It is noted that the arrangement(s) of image icons used in the practice of the present invention may also include prior art image icons formed in their entirety from non-directionally cured pigmented materials.

In one such exemplary embodiment, each image icon in the arrangement(s) of image icons is formed from two cured pigmented materials, each having a different color. Here, each pigmented material is cured using collimated light at an angle through the focusing elements that is different from the angle used to cure the other pigmented material. In particular, this exemplary embodiment may be produced by curing a colored pigmented material using collimated light from one angle, washing the uncured pigmented material from the device, and then adding a second colored pigmented material and curing it at a different angle. The resulting optical device will project a synthetic image(s) of a first color that is viewable at the first cure angle, and a synthetic image(s) of a second color that is viewable at the second cure angle. As will be readily appreciated, a large number of different color pigmented materials could be added this way. Additionally, another different color pigmented material is added that is cured without using collimated light, to provide a "background color" that can be seen from any angle that has not already been used for angular curing.

In another such exemplary embodiment, each image icon in the arrangement(s) of image icons is formed from one cured fluorescent pigmented material and from one cured non-fluorescent pigmented material. Here, the fluorescent feature, which is detectable only at a given angle but not at another given angle, may serve as an effective machine readable authenticating feature.

In a further exemplary embodiment of the present invention, the optical device is a laser markable optical device that basically comprises the optical device described above, and optionally one or more layers located above and/or below the optical device, wherein at least one arrangement or layer of the optical device or at least one layer above or below the optical device is a laser markable arrangement or layer.

The term "laser markable" or any variant thereof, as used herein, is intended to mean capable of physical or chemical modification induced or formed by a laser including, but not limited to, carbonizing, engraving, engraving with or without color change, engraving with surface carbonization, color change or internal blackening, laser marking by coating removal, ablation, bleaching, melting, swelling, and vaporization, and the like.

In a preferred embodiment, the inventive laser markable optical device has: (a) an arrangement of optionally embedded focusing elements (e.g., embedded refractive focusing elements) and an arrangement of image icons that are separated by a laser markable layer that also functions as an optical spacer; and/or (b) one or more laser markable layers located below the optical device.

In the above preferred embodiment, which may be used in embedded lens and other ID products (e.g., a patch embedded in a polymer ID card), personalized data in the form of static two dimensional (2D) images would be laser engraved into or below the optical device at an angle that differs from the angle(s) at which the collimated curing energy was applied.

In the latter embodiment where one or more laser markable layers are located below the optical device, the arrangement of image icons contains "vacant" icon spaces. As previously mentioned, the "vacant" icon spaces are prepared using unpigmented material(s) designed to not absorb laser light (e.g., UV curable mixtures). The unpigmented material(s) in this embodiment is directionally cured at the same angle that a laser engraver would use to write the static 2D images. The remainder of the icon recesses or voids in the arrangement of image icons are filled with pigmented materials cured at angles other than the angle used to cure the unpigmented material(s).

By way of this embodiment, laser energy is allowed to pass through the optical device with little laser energy being absorbed thereby, which provides for superior laser engraving through the optical device.

The present inventors have discovered that certain pigmented materials will absorb laser energy when an attempt is made to laser engrave through the optical device. The result is a defective laser-marked dark image with white or missing areas. This problem can be avoided by carefully choosing which pigments to use, or by employing the above-mentioned "vacant" icon spaces. As will be readily appreciated by those skilled in the art, the use of "vacant" icon spaces allows for the use of any pigment without the concomitant risk of forming defective laser-marked dark images.

The net effect of the above-referenced embodiment is that the colored, pigmented synthetic image(s) would not be visible at the same angle that the static 2D laser engraved image(s) is visible. This means that there would be no pigment in the areas whether the focusing elements tend to focus the laser from the laser engraver, and the risk that the pigmented material(s) would absorb the laser energy is avoided.

As alluded to above, to mark the laser markable optical device of the present invention, light energy from an engraving laser would be focused by the focusing elements and would engrave a laser markable layer in such a way that an image would be formed in the laser markable layer that is only viewable from the engraving angle. This technique allows for greater customization of the inventive device with a dynamic, personalized image that can be made to appear and disappear. Multiple laser marking angles can be used in the same device thereby providing multiple images, each of which is observable from a different viewing angle. In this way, short animations or changing images can be made in a personalized way. By way of example, when such a device is used on or in conjunction with an ID document, a small version of the portrait used for the ID document could be made to turn on and off. This dynamic portrait displayed by the inventive device would be unique to the ID document and would increase the security of the document.

The resulting laser marked optical device would have one or more laser marked static 2D images on the laser markable layer(s). Here, the term "laser marked" or any variant thereof is intended to mean carrying or displaying any mark formed by a laser or laser-like device.

Suitable laser markable layers may be prepared using thermoplastic polymers. In a first category, thermoplastic polymers with good absorption and carbonization may be used. These polymers are laser markable in the absence of so-called laser additives, which are compounds absorbing light at the wavelength of the laser used, and converting it to heat. Examples of these polymers, which produce extensive blackening in the area exposed to the laser, include polyethersulfone (PES), polysulfone (PSU), polycarbonate (PC), and polyphenylene sulfide (PPS). In a second category, thermoplastic polymers with laser additives (e.g., pigments or special additives) may be used. Examples of these polymers, which can be marked uniformly and with good quality, include polystyrene (PS), styrene acrylonitrile (SAN), acrylonitrile butadiene styrene (ABS), PET, PETG, polybutylene terephthalate (PBT) and polyethylene. Examples of these laser additives include carbon black, antimony metal, antimony oxide, tin-antimony mixed oxides, phosphorous-containing mixed oxides of iron, copper, tin and/or antimony, mica (sheet silicate) coated with metal oxides. The laser markable layers have preferred thicknesses ranging from about 5 to about 500 microns, more preferably from about 25 to about 200 microns.

In a preferred laser marking technique, a V-Lase 10 Watt Q-switched 1064 nanometer (nm) laser marking system is used to mark the inventive laser markable device, the laser marking system producing laser light emission at a setting of 30,000 Hertz (Hz). The laser marking system is set to 80% of maximum power, and a scan speed of 200 millimeters per second (mm/sec). These settings produce a high contrast mark in the desired location within the inventive laser markable device without burning or overexposure.

As alluded to above, the present invention also provides sheet materials and base platforms that are made from or employ the inventive optical device, as well as documents made from these materials. The inventive optical device is also contemplated for use with consumer goods as well as bags or packaging used with consumer goods.

By way of example, the inventive optical device can be utilized in a variety of different forms (e.g., strips, patches, security threads, planchettes) with any banknote, secure document or product for authentication purposes. For banknotes and secure documents, these materials are typically used in the form of a strip, patch, or thread and can be partially embedded within the banknote or document, or applied to a surface thereof. For passports or other ID documents, these materials could be used as a full laminate or inlayed in a surface thereof. For product packaging, these materials are typically used in the form of a label, seal, or tape and are applied to a surface thereof. As noted above, in one exemplary embodiment, the optical device is in the form of a patch embedded in a polymer ID card.

What is claimed is:

1. An optical device comprising:
   an icon layer comprising:
   a layer of a cured radiation curable resin,
   an arrangement of directionally cured image icons, each directionally cured image icon comprising a region of a directionally cured material of a first color disposed on the layer of the cured radiation curable resin; and
   an arrangement of focusing elements, each focusing element configured to focus parallel rays of light at a focal point, the focal point associated with an angle at which parallel rays of light impinge a surface of the focusing element,
   wherein some of the directionally cured image icons are disposed at locations proximate to focal points associated with a first set of cure angles,
   wherein the focusing elements project a synthetically magnified image of directionally cured image icons at viewing angles within the first set of cure angles, and
   wherein a scale ratio between the arrangement of focusing elements and the arrangement of directionally cured image icons has a value substantially equal to 1.0000.

2. The optical device of claim 1, wherein the directionally cured image icons comprise posts on a surface of the cured radiation curable resin.

3. The optical device of claim 1, wherein the directionally cured image icons comprise voids in a surface of the cured radiation curable resin.

4. The optical device of claim 1, wherein the arrangement of focusing elements comprises reflective focusing elements.

5. The optical device of claim 1, wherein the icon layer further comprises:
   a second arrangement of directionally cured image icons, each image icon of the second arrangement of directionally cured image icons comprising a region of directionally cured material of a second color disposed on the layer of cured radiation curable resin.

6. The optical device of claim 5, wherein image icons of the second arrangement of directionally cured image icons are disposed at locations proximate to focal points associated with the first set of cure angles.

7. The optical device of claim 5, wherein image icons of the second arrangement of directionally cured image icons are disposed at locations proximate to focal points associated with cure angles outside of the first set of cure angles.

8. The optical device of claim 1, further comprising a laser markable layer, the laser markable layer comprising regions of material whose optical properties are altered in response to application of laser light.

9. The optical device of claim 8, wherein the laser markable layer provides a static, two dimensional image.

10. The optical device of claim 8, wherein the laser markable layer is disposed below the icon layer.

11. The optical device of claim 8, wherein the laser markable layer is disposed above the icon layer.

12. The optical device of claim 8, wherein the regions of material whose optical properties are altered in response to the application of laser light are at locations proximate to focal points associated with cure angles outside of the first set of cure angles.

13. The optical device of claim 1, wherein a focusing element of the arrangement of focusing elements is an embedded focusing element.

\* \* \* \* \*